(12) United States Patent
Komamine et al.

(10) Patent No.: US 7,866,099 B2
(45) Date of Patent: Jan. 11, 2011

(54) MOUNTING STRUCTURE OF SOLAR CELL MODULE

(75) Inventors: Tatsuya Komamine, Kashihara (JP); Yoshihiro Aramaki, Ikoma-gun (JP); Yasushi Ohkoshi, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 195 days.

(21) Appl. No.: 11/887,945

(22) PCT Filed: Mar. 24, 2006

(86) PCT No.: PCT/JP2006/305943
§ 371 (c)(1),
(2), (4) Date: Oct. 5, 2007

(87) PCT Pub. No.: WO2006/109517
PCT Pub. Date: Oct. 19, 2006

(65) Prior Publication Data
US 2009/0025314 A1    Jan. 29, 2009

(30) Foreign Application Priority Data
Apr. 7, 2005    (JP)    ............................. 2005-111137

(51) Int. Cl.
*E04D 13/18* (2006.01)
(52) U.S. Cl. .......................... 52/173.3; 52/545; 52/546; 24/290; 24/295
(58) Field of Classification Search .................... 52/60, 52/173.3, 200, 545, 546, 588.1; 24/290, 24/293, 295; 248/220.21, 300, 301
See application file for complete search history.

(56) References Cited

U.S. PATENT DOCUMENTS

| | | | | |
|---|---|---|---|---|
| 2,929,237 A | * | 3/1960 | Lancer | 52/60 |
| 6,588,711 B2 | * | 7/2003 | Onishi | 248/49 |
| 6,845,592 B2 | * | 1/2005 | Voegele | 52/466 |
| 7,313,893 B2 | * | 1/2008 | Voegele, Jr. | 52/461 |
| 7,441,379 B2 | * | 10/2008 | Konstantin | 52/200 |
| 2004/0163338 A1 | * | 8/2004 | Liebendorfer | 52/173.1 |

FOREIGN PATENT DOCUMENTS

| | | |
|---|---|---|
| JP | 10-176403 A | 6/1998 |
| JP | 11-068137 | 3/1999 |
| JP | 11-324259 | 11/1999 |
| JP | 2001-90313 | 4/2001 |
| JP | 2002-161632 | 6/2002 |
| JP | 2002-364136 | 12/2002 |
| JP | 2003-96987 | 4/2003 |
| JP | 2003-301567 | 10/2003 |

OTHER PUBLICATIONS

PCT International Search Report mailed Jun. 27, 2006.

* cited by examiner

*Primary Examiner*—Brian E Glessner
*Assistant Examiner*—Patrick Maestri
(74) *Attorney, Agent, or Firm*—Nixon & Vanderhye, PC (57) ABSTRACT

A mounting structure of a solar cell module includes a fastening for mounting the solar cell module on a lateral beam. The fastening includes a body, and a plurality of hooks formed at an end of the body. The hooks have a hook having a form bent toward one side, having an end directed downward and serving as a first hook, and a hook having a form bent away from the one side, having an end directed downward and serving as a second hook. The hooks are opposed to and engaged with a projection of a hooked and L-shaped form formed on the solar cell module.

20 Claims, 11 Drawing Sheets

MOUNTING STRUCTURE OF SOLAR CELL MODULE

This application is the U.S. national phase of International Application No. PCT/JP2006/305943 filed 24 Mar. 2006 which designated the U.S. and claims priority to JP 2005-111137 filed 7 Apr. 2005, the entire contents of each of which are hereby incorporated by reference.

TECHNICAL FIELD

The present technology relates to a mounting structure of a solar cell module.

BACKGROUND ART

A solar cell device includes a solar cell module and a support device, and has a structure in which the solar cell module is supported on the support device.

Some kinds of solar cell devices are arranged on roofs of buildings. In recent years, the solar cell devices for family use have been spreading, and a majority of them are arranged on roofs of personal buildings.

Japanese Patent Laying-Open No. 11-68137 has disclosed a installing device for solar cell modules, in which lateral beams each having a C-shaped section are arranged on a roof with their openings directed upward, and the solar cell modules are fixed to upper sides of the lateral beams. In this installing device, a frame extending along an outer periphery of the solar cell module is laid on the lateral beams, and the solar cell modules are fixed by a fixing frame member pushing them from the upper side.

In the installing device, the lateral beams are arranged parallel to a crossbeam, and are spaced from each other by a distance corresponding to a width of the solar cell module. A space is formed between the solar cell modules, and the fixing frame member is arranged in this space. The fixing frame member is fixed by a fastener or fastening arranged in the space between the solar cell modules to push the solar cell modules.

Depending on the type of the roofing, it may be difficult to fix longitudinal and lateral beams directly to the roofing. For example, it is difficult to fix the longitudinal and lateral beams to roofing tiles used as a roofing. Japanese Patent Laying-Open No. 11-324259 has disclosed a solar cell module mounting structure employing a metal support that has the same form as a roofing, and is provided with a projection for fixing a longitudinal beam thereto.

According to this mounting structure, the metal support is fixed to the longitudinal beam, and the lateral beam is fixed to the longitudinal beam via a fastening. The solar cell module is fixed to the lateral beam. The solar cell module is arranged with its ends in contact with an upper surface of the lateral beam. A space is formed between the solar cell modules. A fixing bolt is arranged in this space for fixing a cover that fixes the solar cell modules together. The ends of the solar cell modules opposed together are fixed together by the cover that has a substantially U-shaped section and is fixed to the upper sides thereof by nuts.

Publication 1: Japanese Patent Laying-Open No. 11-68137

Publication 2: Japanese Patent Laying-Open No. 11-324259

DISCLOSURE OF THE TECHNOLOGY

Problems to be Solved by the Technology

In the solar cell module mounting structures disclosed in the above publications, the lateral beams are fixed to the roof. Then, the solar cell modules are arranged on the upper surfaces of the lateral beams, and are positioned in a direction from a ridge of the roof to a lower edge thereof, (i.e., in a flow direction of rainwater to be referred to as a "flow direction"). The fixing cover fixes the solar cell modules from the upper side. The fixing cover is substantially parallel to the lateral beam. The fixing cover is fixed to the lateral beam by the fastening such as a screw. The fastening such as a screw is arranged between the solar cell modules.

In the mounting structure of the solar cell module of the prior art, the space is required between the solar cell modules for arranging the fastening therebetween. This causes an area or region where arrangement efficiency of the solar cell modules is low. For example, when a house has a roof of a small area, it may be impossible to arrange the solar cell modules of a sufficient capacity, and it has been demanded to improve the arrangement efficiency.

In an operation of fixing the solar cell modules to the lateral beams, the solar cell modules are successively fixed to the lateral beams, e.g., in the order from the lower position to the upper position along the flow direction. According to the mounting structure of the solar cell modules of the prior art, the solar cell modules are arranged in advance, the fixing covers are arranged in the spaces between the solar cell modules and then the fixing covers and the solar cell modules are fixed by fastenings such as nuts. Therefore, the neighboring solar cell modules must be arranged before arranging the fixing cover therebetween.

In an operation of clamping the fastening for fixing the fixing cover, the solar cell modules are arranged on the opposite sides of the fixing cover, respectively, so that a worker must reach a worker's hand or body for clamping the fastening located in a deep or remote position, resulting in low work efficiency. Further, there is a risk that the worker tumbles or falls from the roof because the worker fixes the fixing cover while keeping an unnatural posture. Therefore, improvements have been demanded.

Means for Solving the Problems

An object is to provide a mounting structure of a solar cell module that improves workability in an operation of mounting solar cell modules, and also improves installation efficiency of the solar cell modules.

A mounting structure of a solar cell module includes a fixing member for attaching the solar cell module to a beam member, and the fixing member includes a body, and a plurality of hooks formed at an end of the body and each having a hooked form. The hooks have a first hook having a form bent toward one side, and having an end directed downward, and a second hook having a form bent away from the one side, and having an end directed downward. At least one of the first and second hooks is opposed to and engaged with an engagement portion of a hooked form formed at the solar cell module. By employing this structure, it is possible to provide the mounting structure of the solar cell module that improves workability in an operation of mounting the solar cell module, and also improves installation efficiency of the solar cell module.

Preferably, the fixing member has the body of a plate-like form, and a plate-like attaching portion to be in contact with the beam member via a plane. The body has a main surface substantially perpendicular to a main surface of the attaching portion. By employing this structure, a height of the body can be adjusted to adjust a distance between the hook and the attaching portion, and the technology can be applied to the solar cell module of an arbitrary thickness.

Preferably, the attaching portion is arranged under the solar cell module. Employment of this structure can eliminate a portion for fixing the solar cell module from between the solar cell modules, and can reduce a distance between the solar cell modules. Consequently, the installation efficiency is improved.

Preferably, the hooks are formed such that the first and second hooks are located alternately to each other in the direction of alignment of the first and second hooks. By employing this structure, the solar cell modules that are arranged on the one and the other sides of the fixing member, respectively, can be fixed by a uniform pressing force, and therefore can be fixed stably.

Preferably, at least one of the first and second hooks has a projection at a portion engaged with the engagement portion. By employing this structure, the solar cell module can be reliably fixed. When the engagement portion is made of an electrically insulating material such as an alumite layer, the projection breaks through the insulating material to bring the fixing member into contact with the engagement portion for grounding.

Preferably, the fixing member includes a receiver for carrying a bottom of the solar cell module from a lower side. By employing this structure, the solar cell module can be stably fixed to the fixing member.

Preferably, the fixing member includes a fin being in contact with a side surface of the solar cell module. By employing this structure, the solar cell module can be positioned easily by bringing the fin into contact with the solar cell module. Also, the fixing member can easily carry the solar cell module.

Preferably, the fin has a projection opposed to the solar cell module. By employing this structure, the projection can be cut or engaged into a mount frame arranged at a periphery of the solar cell module so that the solar cell module can be carried stably.

Preferably, at least one of the first and second hooks has a projection at a portion engaged with the engagement portion, and the projection of the hook is formed on a side opposite to a side of arrangement of the fin. By employing this structure, the projection of the hook and the projection of the fin can be directed toward the opposite sides, respectively, and the mount frames of the solar cell modules neighboring to each other with the fixing member therebetween can be electrically connected together. By grounding an arbitrary mount frame, it is possible to perform easily the grounding of the mount frame electrically connected by the engagement portion.

Preferably, the solar cell module includes an element plate provided with a solar cell element, and a mount frame surrounding an edge of the element plate. The mount frame has the engagement portion, and a rib arranged above the engagement portion. The rib has a plane form and covers a space between the element plate and the fixing member. By employing this structure, the rib can suppress entry of rainwater.

Preferably, the beam member has a rail having a substantially U-shaped section for parallel movement of the fixing member in a longitudinal direction, and a base formed for arranging the solar cell module and located on a side opposite to a side of formation of the rail. By employing this transistor, the fixing member can be fitted into the rail to facilitate positioning of the fixing member on the beam member. Further, the fixing member can be stably fixed to the beam member. Further, the base formed as described above can carry the solar cell module.

Preferably, the beam member has a boundary side wall formed by extending one of side walls of the rail upward. Employment of this structure can increase a strength of the beam member. Also, the fixing member can be stably fitted into the rail of the beam member. Further, the solar cell module can be positioned easily by bringing it into contact with the boundary side wall.

Preferably, the fixing member includes a plurality of touching portions projected for contact with the boundary side wall, and a longitudinal direction of each of the touching portions is substantially parallel to a vertical direction. Employment of this structure can prevent such a situation that the fixing member is in intimate contact with the boundary side wall, and water enters into a minute space between the fixing member and the boundary side wall due to a capillary phenomenon. It is also possible to suppress accumulation of water in a region outside the region where the touching portion is formed.

EFFECTS OF THE TECHNOLOGY

The technology can provide the mounting structure of the solar cell module that improves workability in an operation of mounting the solar cell module, and also improves installation efficiency of the solar cell module.

DESCRIPTION OF THE REFERENCE SIGNS 1 fastening, 2 lateral beam, 3 mount frame, 4 edge/ridge cover, 5 plate nut, 11a and 11b hook, 12 body, 13 attaching portion, 14 receiver, 15 and 17 projection, 16 fin, 18 touching portion, 19 insert hole, 21 rail, 22a and 22b base, 23 boundary side wall, 24 opening, 31 L-shaped projection, 32a and 32b rib, 33 insert portion, 34 placing portion, 41 L-shaped projection, 42a and 42b rib, 43 insert portion, 44 contact portion, 45 cover, 51a and 51b contact portion, 52 guide hole, 53 screw hole, 71 bolt, 72 washer, 73 screw, 81 glass plate, 82 element plate 91, 92 and 94-98 arrow.

BEST MODES FOR CARRYING OUT THE TECHNOLOGY

Referring to FIGS. 1 to 17, a mounting structure of a solar cell module will now be described. A solar cell device in the embodiment includes solar cell modules and a mounting device of the solar cell modules.

In this embodiment, the solar cell device is arranged on a roof of a house. For example, when longitudinal beams are arranged on the roof with a predetermined space therebetween, as disclosed in Japanese Patent Laying-Open No. 11-324259, the mounting structure of the solar cell modules is substantially the same as that in the prior art.

Figure 1:
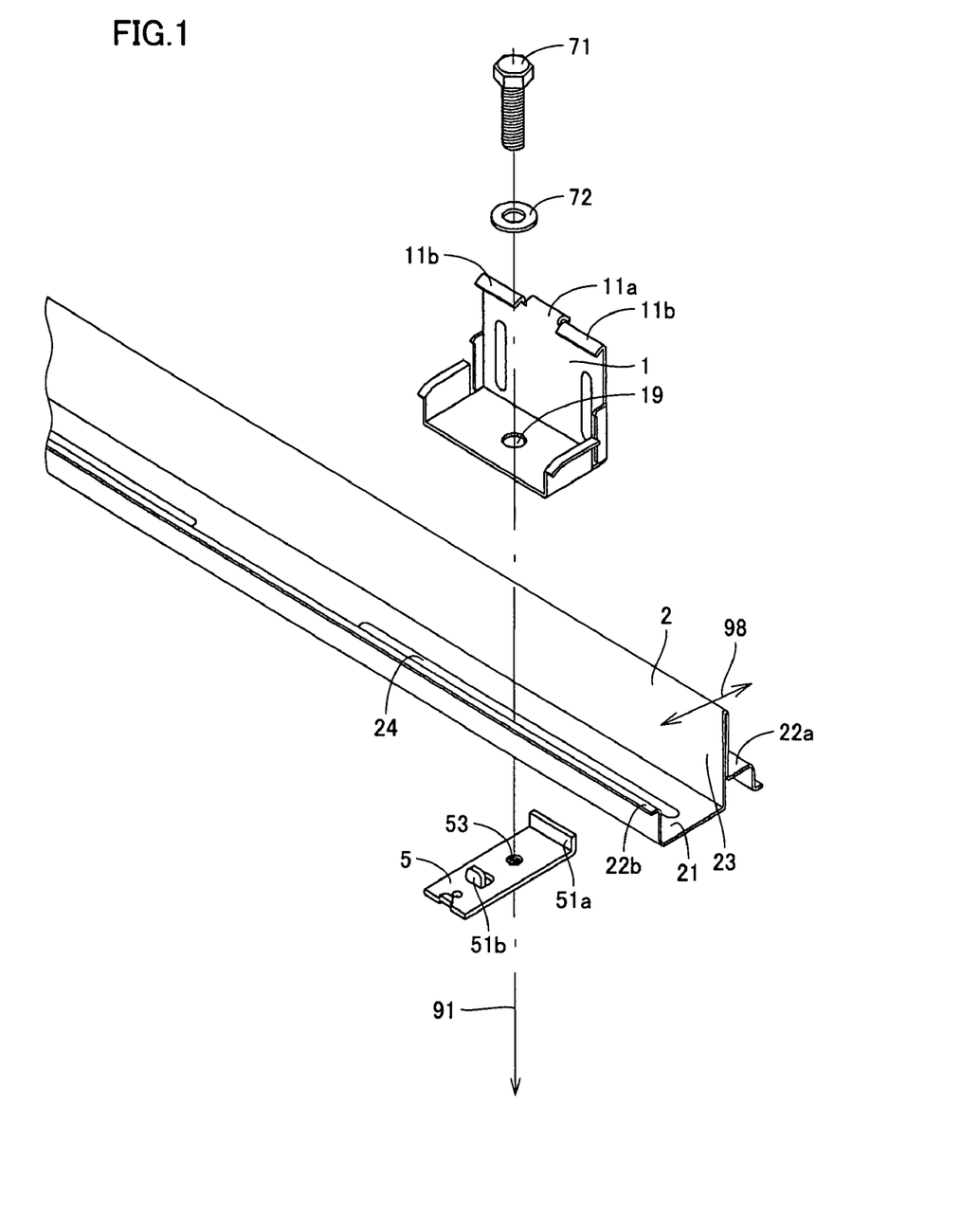
FIG. 1 is an exploded perspective view showing a portion including a fastening of a mounting device according to an embodiment.

FIG. 1 is an exploded perspective view showing a part of the mounting structure of the solar cell module according to the embodiment, and particularly showing a part including a lateral beam and a fastening arranged thereon.

The mounting device of the solar cell module according to the embodiment includes a lateral beam 2 serving as a beam member, a fastening 1 that is a metal part for fixing or attaching the solar cell module to lateral beam 2, and a plate nut 5 for fixing fastening 1 to lateral beam 2. In this embodiment, lateral beam 2 is made of metal. Further, fastening 1 is made of metal. Plate nut 5 is used as indicated by an arrow 91 to fix fastening 1 to lateral beam 2.

Lateral beam 2 has a longitudinal direction that is substantially parallel to a horizontal crossbeam of the roof. Lateral beam 2 is arranged substantially perpendicular to the longitudinal direction of the longitudinal beam. The longitudinal beam has a longitudinal direction that is substantially parallel to a flow direction of the roof although not shown.

Figure 2:
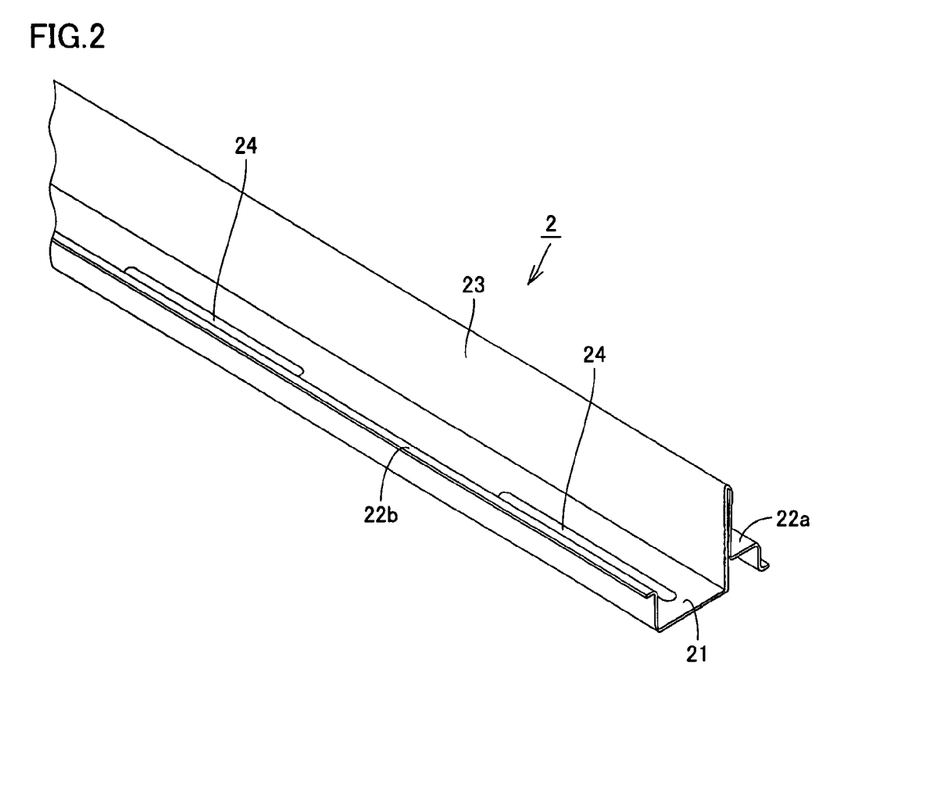
FIG. 2 is a perspective view of a lateral beam in the embodiment.
Figure 3:
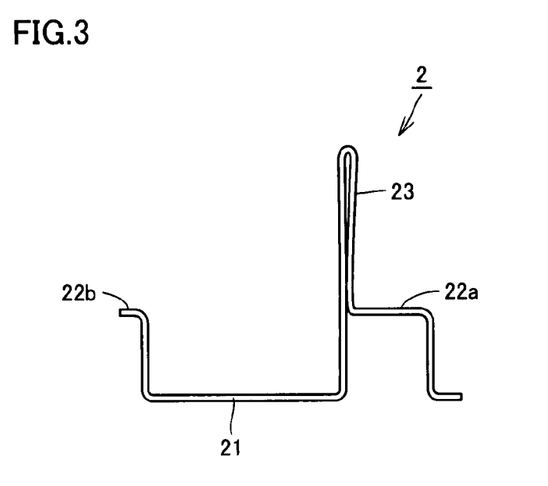
FIG. 3 is a side view of the lateral beam in the embodiment.

FIG. 2 is a perspective view of the lateral beam in this embodiment. FIG. 3 is a side view of the lateral beam in this embodiment. Lateral beam 2 in this embodiment is made of one plate member.

Referring to FIGS. 1 to 3, lateral beam 2 in this embodiment includes a rail 21 having a substantially U-shaped section for allowing a parallel movement of fastening 1 in the longitudinal direction. Rail 21 has a size corresponding to a depth of fastening 1, and is configured to allow fitting of fastening 1 to rail 21.

Rail 21 is provided at its one end with a base 22b for carrying the solar cell module from its lower side. Base 22b has a substantially horizontal main surface. Base 22b is formed by bending one end of rail 21. Rail 21 is provided at its bottom surface with a long opening 24. Opening 24 is elongated in the longitudinal direction of lateral beam 2. Opening 24 is configured to insert a bolt 71 therethrough for fixing fastening 1.

Lateral beam 2 has a base 22a that is formed on the side opposite to rail 21 for carrying the solar cell module from its lower side. Base 22a has a step-form, and a horizontal portion of one step is located at the same level or height as base 22b.

Lateral beam 2 includes a boundary side wall 23 formed of a upward side wall of rail 21. Boundary side wall 23 extends substantially vertically. In this embodiment, boundary side wall 23 has a portion at which the plate-like member bends. Boundary side wall 23 is formed of two plate portions overlaid together. The solar cell modules are arranged on the opposite sides of boundary side wall 23, respectively.

Figure 4:
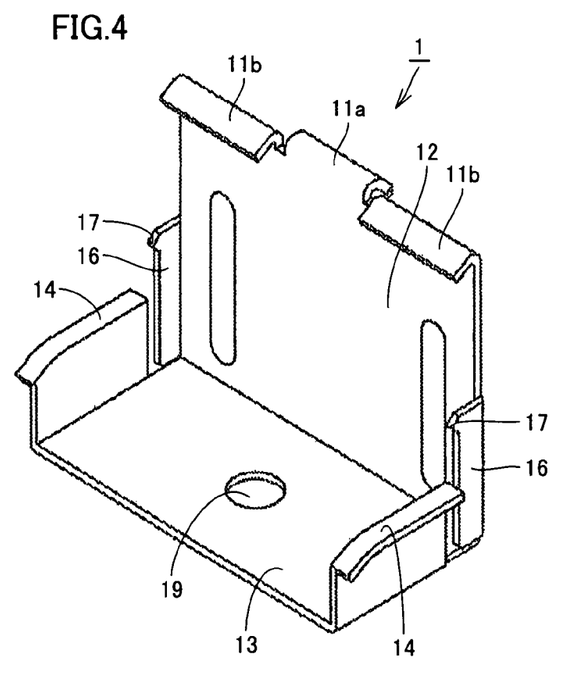
FIG. 4 is a perspective view showing a front side of the fastening in the embodiment.
Figure 6:
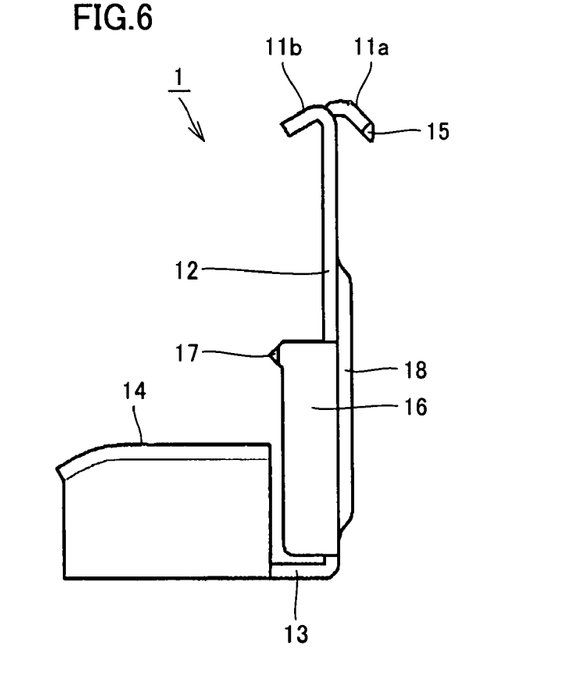
FIG. 6 is a side view of the fastening in the embodiment.

FIG. 4 is a perspective view of the fastening in this embodiment. FIG. 6 is a side view of the fastening in this embodiment. The fastening in this embodiment has a longitudinal size of about 4 cm, a lateral size of about 6 cm and a height of about 6 cm. The fastening in this embodiment is made of a plate of about 1.6 mm in thickness.

Referring to FIGS. 1, 4 and 6, fastening 1 includes a body 12 having a plate-like form, and hooks 11a and 11b that are formed at an end of body 12 and each has a hooked form. The hooks include hook 11a that is bent toward one side, has an end directed downward and serves as a first hook. The hooks also include hook 11b that is bent oppositely to the one side, has an end directed downward and serves as a second hook. Fastening 1 in this embodiment has the three hooks, and each of hooks 11a and 11b is formed by bending an end of body 12.

First and second hooks 11a and 11b are located alternately to each other in the direction of alignment of the first and second hooks 11a and 11b. In this embodiment, hook 11a is formed at its substantially central position in the direction of width of body 12, and hooks 11b are formed with hook 11a interposed therebetween, i.e., on the opposite sides of hook 11a, respectively.

Fastening 1 in this embodiment includes a plate-like attaching portion 13 to be in plane-contact with the lateral beam. Attaching portion 13 has a main surface that is substantially perpendicular to a main surface of body 12. In a plan view, attaching portion 13 is provided at its substantially central position with an insert hole 19 for inserting a bolt 71 therethrough.

Receivers 14 are formed on the opposite sides in the width direction of attaching portion 13, respectively. Each receiver 14 in the embodiment extends upward from the main surface of attaching portion 13, and has a substantially L-shaped section. When fastening 1 is arranged on lateral beam 2, receiver 14 has substantially the same height as base 22b. Receiver 14 is configured to carry the bottom of the solar cell module from its lower side.

Body 12 is provided at its opposite ends in the width direction with fins 16, respectively. Each fin 16 has a plate-like form, and has a main surface substantially perpendicular to the main surface of body 12. Each fin 16 is provided at its upper end in the height direction with a projection 17. Projection 17 has a substantially triangular plane form, and is projected toward the solar cell module to be arranged. Projection 17 has a sharp or pointed end, and is configured to be stuck into an outer mount frame of the solar cell module. Fin 16 is configured to be in contact with a side surface of the solar cell module.

Figure 5:
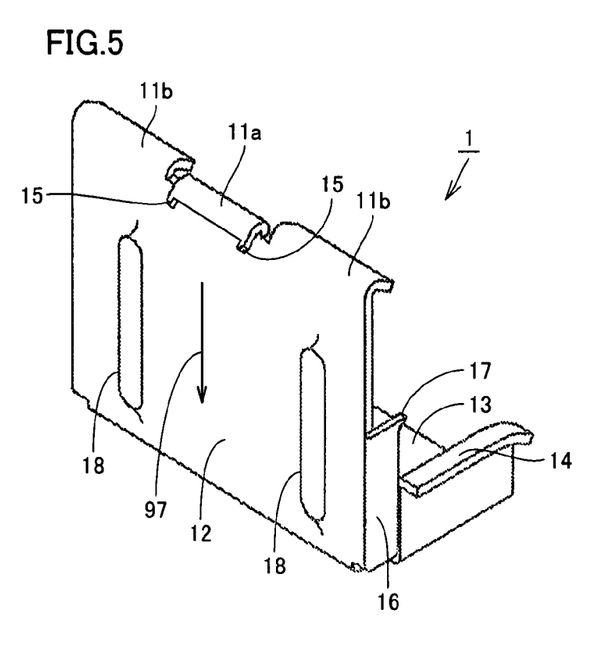
FIG. 5 is a perspective view showing a rear side of the fastening in the embodiment.

FIG. 5 is a perspective view showing a rear side of the fastening in the embodiment. Referring to FIGS. 1, 5 and 6, hook 11a serving as the first hook is provided at its opposite ends in the width direction with projections 15, respectively. Projection 15 has the pointed end. Projection 15 is projected toward an engagement portion of the mount frame of the solar cell module to be described later.

In this embodiment, projection 15 of hook 11a is formed on the side opposite to fin 16 with body 12 therebetween. Thus, projection 17 formed at fin 16 and projection 15 formed at hook 11a are directed away from each other in this embodiment.

Body 12 is provided at its rear main surface with touching portions 18 protruding from body 12. In this embodiment, body 12 has two touching portions 18. Each touching portion 18 has a longitudinal direction that is substantially parallel to the height direction of body 12. Thus, as indicated by an arrow 97, touching portions 18 are formed to pass water between them. An end of each touching portion 18 has a plane for plane-contact with the surface of boundary side wall 23 of lateral beam 2.

Figure 7:
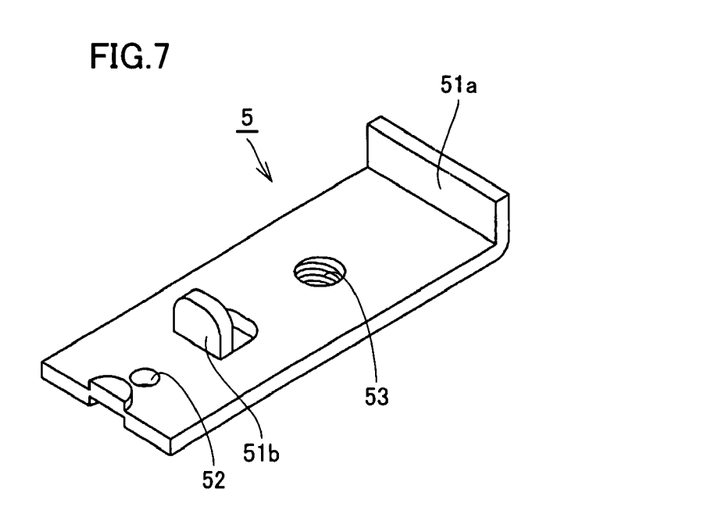
FIG. 7 is a perspective view of a plate nut in the embodiment.

FIG. 7 is a perspective view of the plate nut in this embodiment. Referring to FIGS. 1 and 7, plate nut 5 in this embodiment has contact portions 51a and 51b, a screw hole 53 and a guide hole 52. Plate nut 5 has a plate-like form.

Contact portions 51a and 51b are spaced from each other for fitting a bottom of lateral beam 2 between them. Thus, a distance between contact portions 51a and 51b corresponds to an outer width of rail 21 of lateral beam 2.

Screw hole 53 is formed in a position corresponding to opening 24 in lateral beam 2. When plate nut 5 is arranged on lateral beam 2, screw hole 53 continues to opening 24 in lateral beam 2. Screw hole 53 is located between two contact portions 51a and 51b. Guide hole 52 is configured to screw a guide pin thereinto. Guide hole 52 is located at an end in the longitudinal direction of plate nut 5.

Referring to FIG. 1, fastening 1 is fitted into rail 21 of lateral beam 2. Rail 21 is fitted between contact portions 51a and 51b of plate nut 5. Plate nut 5 and bolt 71 fix fastening 1 to lateral beam 2. Bolt 71 is fixed into screw hole 53 with a washer 72 therebetween. In this embodiment, another bolt that is spaced from fastening 1 fixes lateral beam 2 to the longitudinal beam (not shown).

In FIG. 1, an arrow 98 indicates the flow direction on the roof. One of the solar cell modules is arranged on one side in the direction indicated by arrow 98 with respect to a boundary defined by boundary side wall 23, and the other solar cell module is arranged on the other side with respect to boundary side wall 23. Lateral beams 2 are spaced in the flow direction by a predetermined distance. Among the plurality of lateral beams 2, the lateral beams at the opposite ends in the flow direction (i.e., the lateral beams located in the highest and lowest positions, respectively, when viewed from the front) are covered with edge/ridge covers attached thereto for serving as lateral beam covers, respectively.

Figure 8:
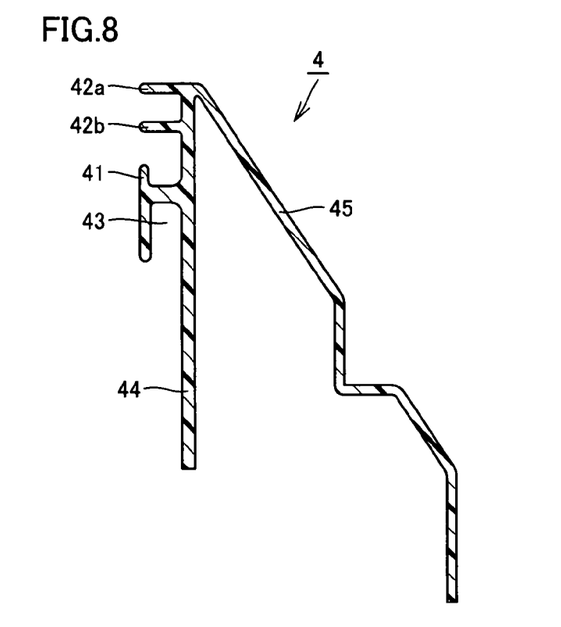
FIG. 8 is a cross section of an edge/ridge cover in the embodiment.

FIG. 8 is a cross section of an edge/ridge cover in this embodiment. FIG. 8 shows a section perpendicular to the longitudinal direction of the edge/ridge cover. Referring to FIGS. 1 and 8, an edge/ridge cover 4 has a longitudinal direction that is substantially parallel to the direction of extension of the lateral beam. In this embodiment, edge/ridge cover 4 is made of resin.

Edge/ridge cover 4 includes an insert portion 43. Insert portion 43 has a substantially U-shaped section for fitting boundary side wall 23 of lateral beam 2 thereinto. Insert portion 43 has an opening directed downward.

Edge/ridge cover 4 includes an L-shaped projection 41 having an L-shaped section. L-shaped projection 41 has a bent end directed upward. L-shaped projection 41 is formed above insert portion 43. L-shaped projection 41 is engaged with hook 11a formed on fastening 1.

Edge/ridge cover 4 has ribs 42a and 42b formed at a top portion. Each of ribs 42a and 42b has a plane form, and has a substantially horizontal main surface. Edge/ridge cover 4 includes a contact portion 44 extending downward. Contact portion 44 has a plate-like form, and has an end to be in contact with the surface of base 22a of fastening 1.

Edge/ridge cover 4 includes a cover portion 45. Cover portion 45 has a plate-like form, and extends from rib 42a.

Figure 9:
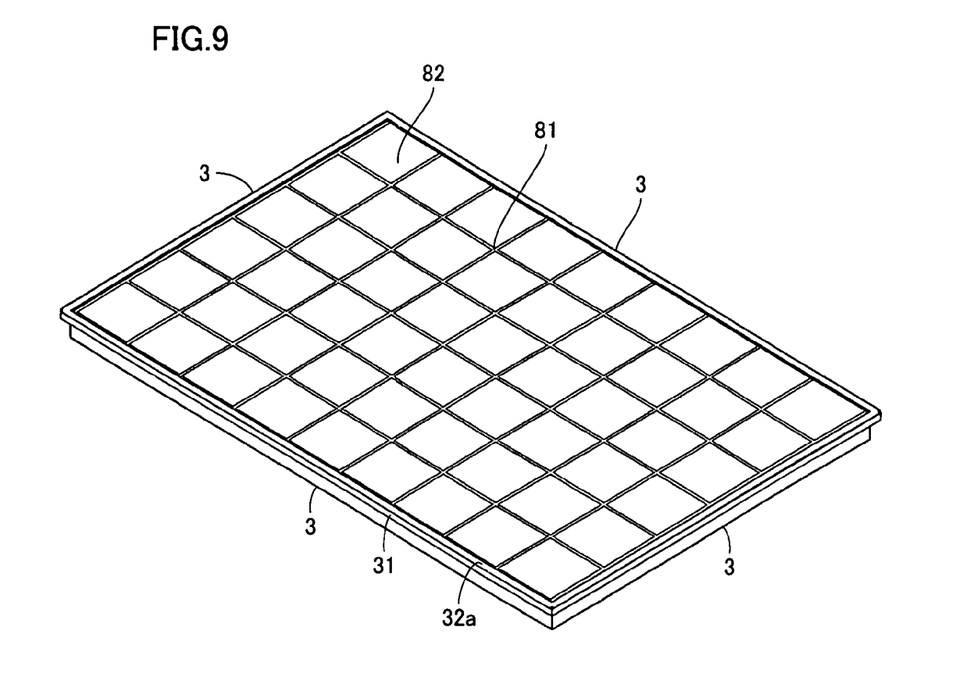
FIG. 9 is a perspective view of a solar cell module in the embodiment.

FIG. 9 is a schematic perspective view of the solar cell module in this embodiment. The solar cell module in this embodiment includes an element plate 82 in which solar cell elements are arranged. Element plate 82 is provided at its surface with a glass plate 81 protecting the solar cell elements. A mount frame 3 of the solar cell module that surrounds the element plate 82 is arranged at the periphery of the solar cell module. Mount frame 3 is arranged along the periphery of element plate 82. Mount frame 3 in this embodiment is formed of aluminum. The solar cell module in this embodiment has a long side of about 1.3 m and a short side of about 1.2 m in the plan view.

Figure 10:
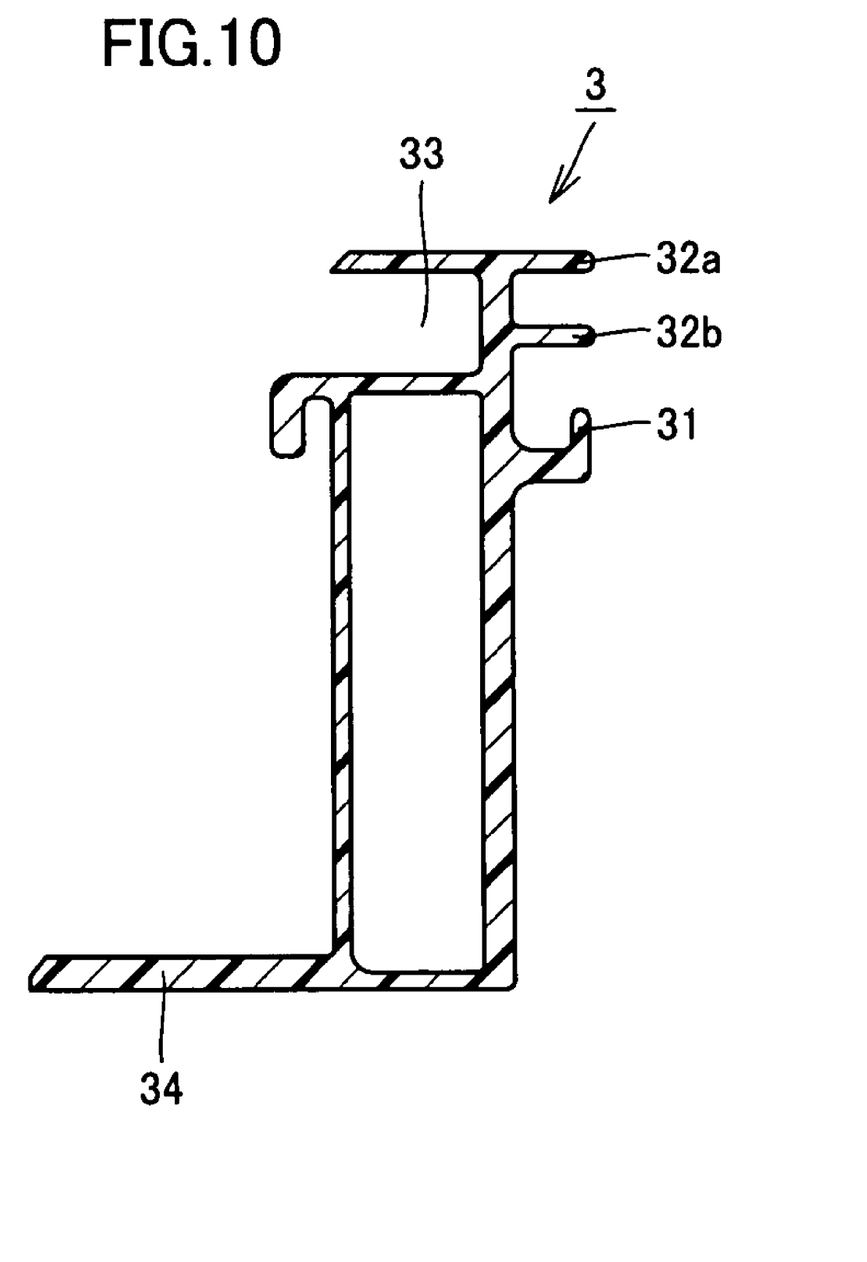
FIG. 10 is a cross section of a mount frame of the solar cell module in the embodiment.

FIG. 10 is a cross section of the mount frame of the solar cell module in the embodiment. FIG. 10 shows a section perpendicular to the longitudinal direction of the mount frame.

Mount frame 3 is provided at its upper portion with an insert portion 33 for holding the glass plate of the solar cell module from its opposite sides. Mount frame 3 includes a placing portion 34 for placing the element plate on its surface. Placing portion 34 has a plate-like form.

Mount frame 3 includes an L-shaped projection 31 for engagement with hooks 11a and 11b of fastening 1. L-shaped projection 31 is an engagement portion of a hooked form, and is directed toward an outer side of the solar cell module when it is arranged. L-shaped projection 31 has an end directed upward. In the plan view showing mount frame 3, L-shaped projection 31 extends in the direction of extension of mount frame 3. L-shaped projection 31 has the end opposed to and engaged with the hooks 11a and 11b.

Mount frame 3 is provided at its upper portion with ribs 32a and 32b that extend outward and each have a plane-like form. Ribs 32a and 32b are projected outward. When the solar cell module is fixed to the lateral beam, ribs 32a and 32b are arranged at the vertical positions opposed to ribs 42a and 42b (see FIG. 8) of edge/ridge cover 4, respectively. Each of ribs 32a and 32b has a plane-like form.

Referring to FIGS. 11 to 17, the solar cell module is mounted on the roof by the mounting structure of the embodiment in the following method.

Figure 11:
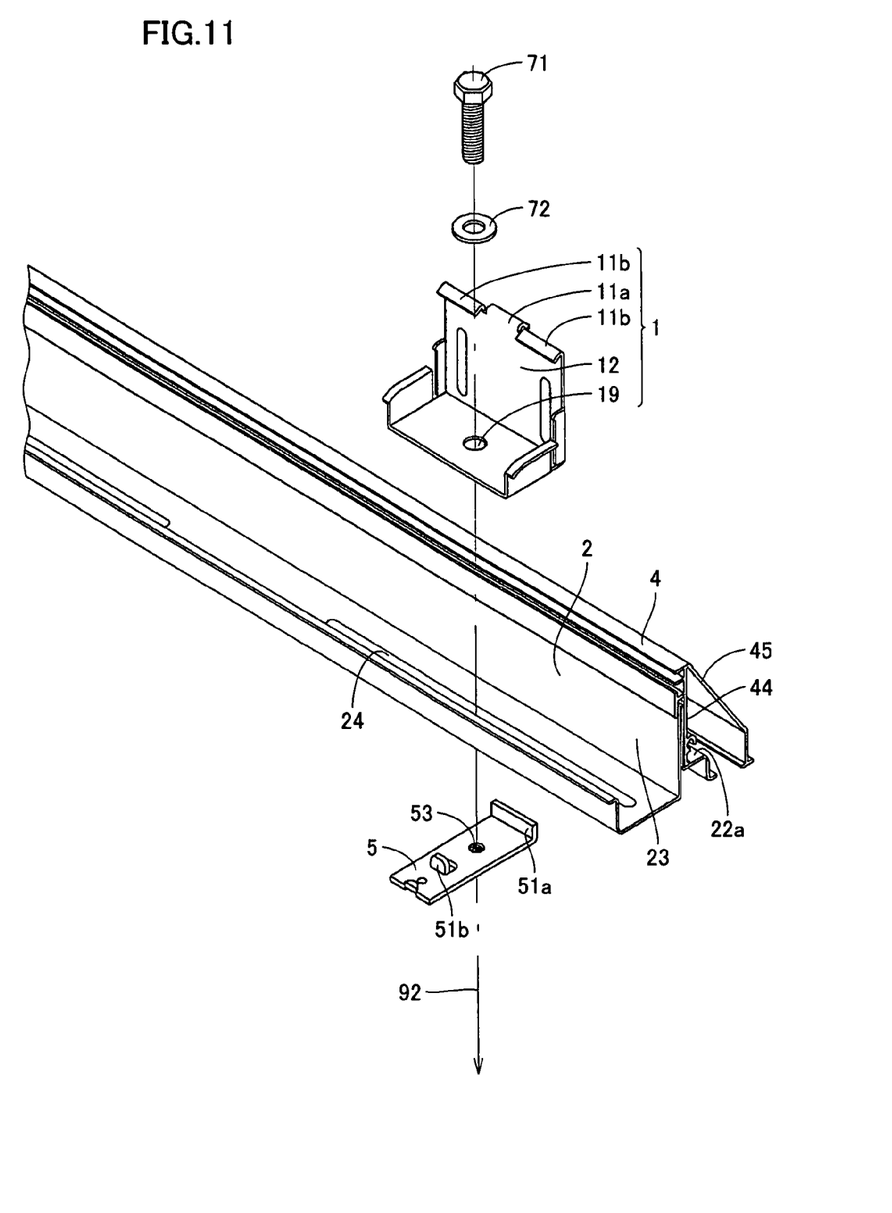
FIG. 11 is an explode perspective view showing the lateral beam on the lowest side and the fastening.
Figure 12:
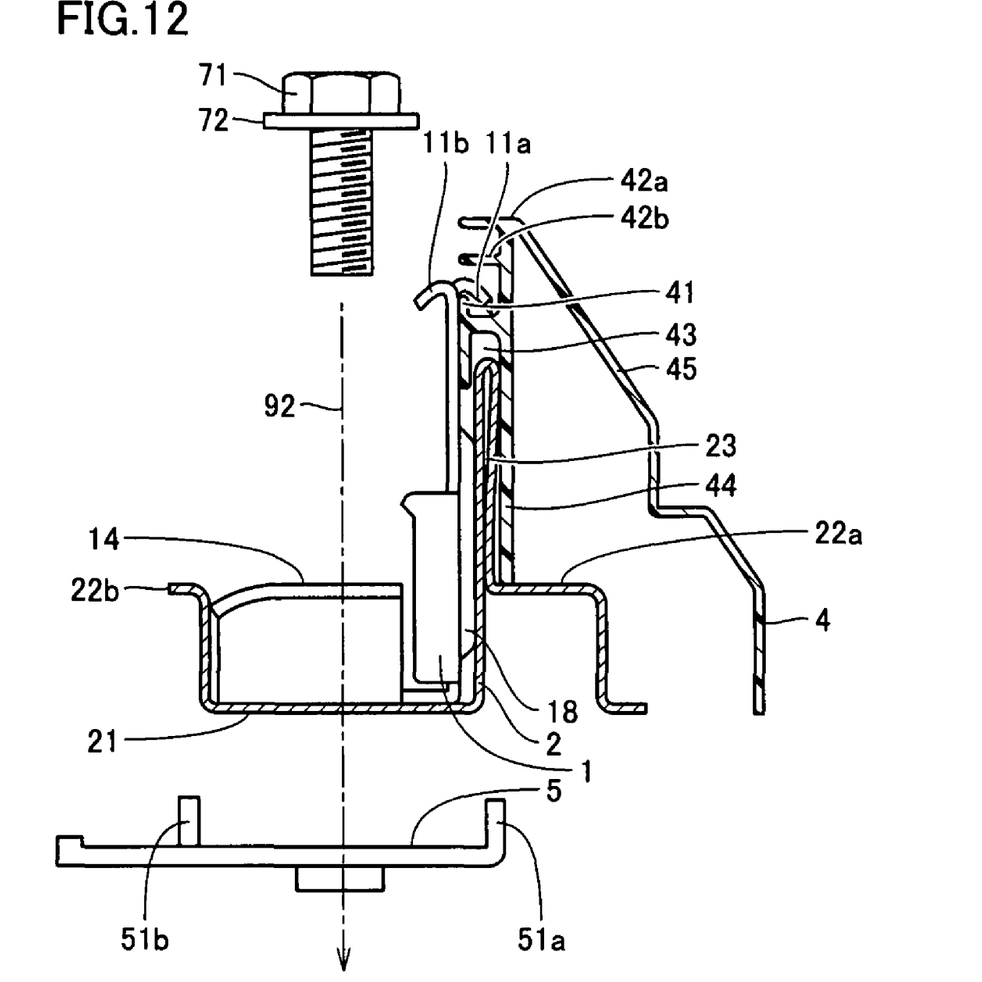
FIG. 12 is a fragmentary cross section showing the lateral beam on the lowest side and the fastening.

FIG. 11 is an exploded perspective view showing one of the plurality of lateral beams, and particularly the lateral beam nearest to the roof edge, i.e., the lowest lateral beam as well as the fastening. FIG. 12 is a fragmentary cross section showing the lateral beam nearest to the roof edge (i.e., lower edge) as well as the fastening. In this embodiment, the longitudinal beams are fixed to the roof in a known manner such that each longitudinal beam extends in the flow direction of the roof. Then, the lateral beams are fixed to the longitudinal beams, e.g., by bolts (not shown).

Referring to FIGS. 11 and 12, edge/ridge cover 4 is arranged on lateral beam 2 fixed to the longitudinal beams. Edge/ridge cover 4 is arranged with cover portion 45 located on the edge side. Edge/ridge cover 4 is arranged in contact with base 22a of lateral beam 2. Insert portion 43 is fitted to a top portion of boundary side wall 23.

Then, fastening 1 is arranged on lateral beam 2. For this arrangement, fastening 1 is fitted into rail 21 of lateral beam 2. Touching portion 18 of fastening 1 comes into contact with boundary side wall 23 of lateral beam 2. In this state, hook 11a of fastening 1 is engaged with L-shaped projection 41 of edge/ridge cover 4.

Then, lateral beam 2 is fitted between two contact portions 51a and 51b of each plate nut 5. In this fitting operation, plate nut 5 is kept in contact with the bottom surface of lateral beam 2, e.g., by a hand for preventing rotation of plate nut 5 by contact portions 51a and 51b, and bolt 71 is screwed into screw hole 53 as indicated by an arrow 92. By screwing bolt 71 into plate nut 5, washer 72, fastening 1, lateral beam 2 and plate nut 5 are fixed in this order.

Edge/ridge cover 4 is fixed to lateral beam 2 by fitting insert portion 43 to the top portion of boundary side wall 23, and pushing L-shaped projection 41 downward by hook 11a. Since hook 11a of fastening 1 has projection 15 at its end (see FIG. 5), projection 15 is stuck into edge/ridge cover 4 to achieve grounding.

Then, the second lateral beam, i.e., the upper lateral beam next to the lowest lateral beam is arranged substantially parallel to it. The plurality of lateral beams are arranged such that the extension directions thereof are substantially parallel to each other. The second lateral beam is arranged on the longitudinal beams without attaching the edge/ridge cover thereto. The second lateral beam is arranged corresponding to the length of the solar cell module. Then, the first solar cell module, i.e., the solar cell module in the first position nearest to the roof ridge is arranged.

Figure 13:
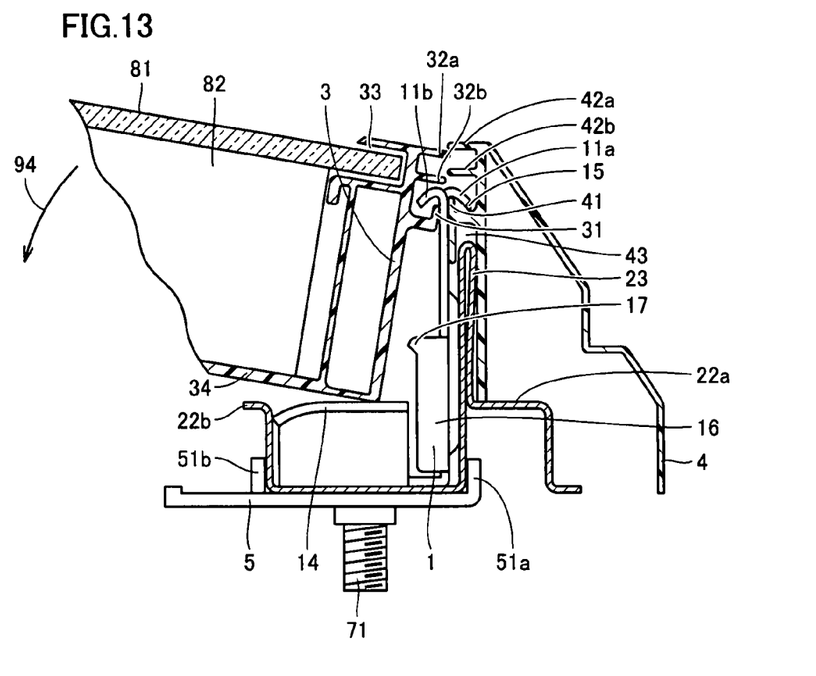
FIG. 13 is a fragmentary cross section of structures including the solar cell module on the lowest side arranged on the lateral beam.

FIG. 13 is a fragmentary cross section showing the solar cell module nearest to the roof edge on the lateral beam nearest to the roof edge. Lateral beam 2 is fixed to the longitudinal beam with edge/ridge cover 4 attached thereto. The solar cell module includes element plate 82, and mount frame 3 is arranged around element plate 82. Mount frame 3 extends along the outer periphery of element plate 82, and surrounds the edges of element plate 82. Glass plate 81 of element plate 82 is inserted into upper insert portion 33 of mount frame 3.

For arranging the solar cell module, it is mounted in an inclined position to bring mount frame 3 into contact with fastening 1 so that hook 11b of fastening 1 is engaged with L-shaped projection 31 of mount frame 3 of the solar cell module. Then, as indicated by an arrow 94, the solar cell module is arranged with its main surface substantially parallel to the roof surface.

Figure 14:
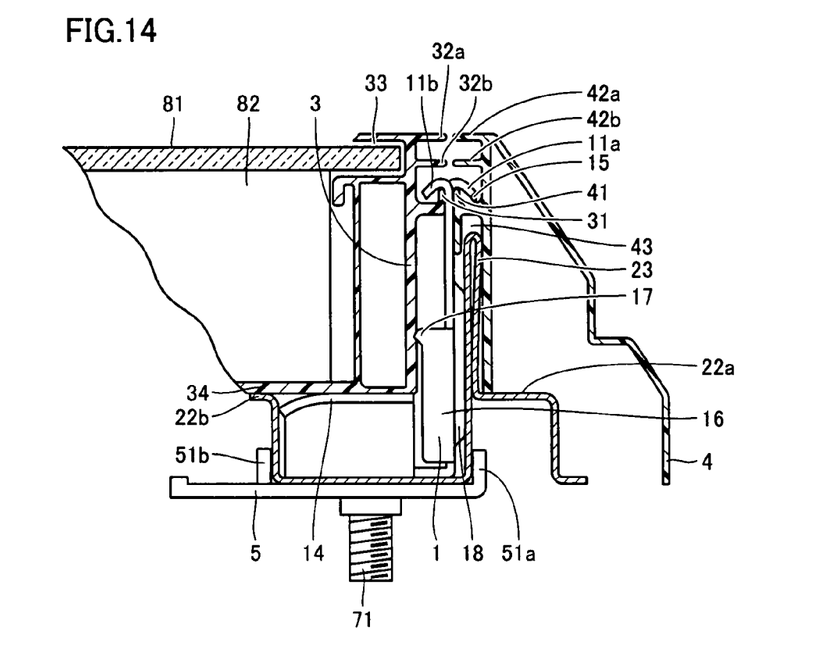
FIG. 14 is a fragmentary cross section of structures including the solar cell module on the lowest side arranged on the lateral beam.

FIG. 14 is a fragmentary cross section showing the lateral beam located nearest to the roof edge together with the solar cell module nearest to the roof edge. The solar cell module is in contact with receiver 14 of fastening 1 and base 22b of lateral beam 2, and is carried thereby. L-shaped projection 31 of mount frame 3 is engaged with hook 11b of fastening 1 so that the solar cell module can be fixed to prevent upward movement or disengagement thereof. Also, projection 17 formed at fin 16 of fastening 1 is stuck into mount frame 3.

Rib 32a of mount frame 3 and rib 42a of edge/ridge cover 4 are arranged on the same plane, and are opposed to each other. Further, rib 32b of mount frame 3 and rib 42b of edge/ridge cover 4 are arranged on the same plane, and are opposed to each other. Since ribs 32a and 32b of mount frame 3 are arranged on the same plane as ribs 42a and 42b of edge/ridge cover 4, and are opposed thereto, respectively, this structure can prevent entry of rainwater.

Figure 15:
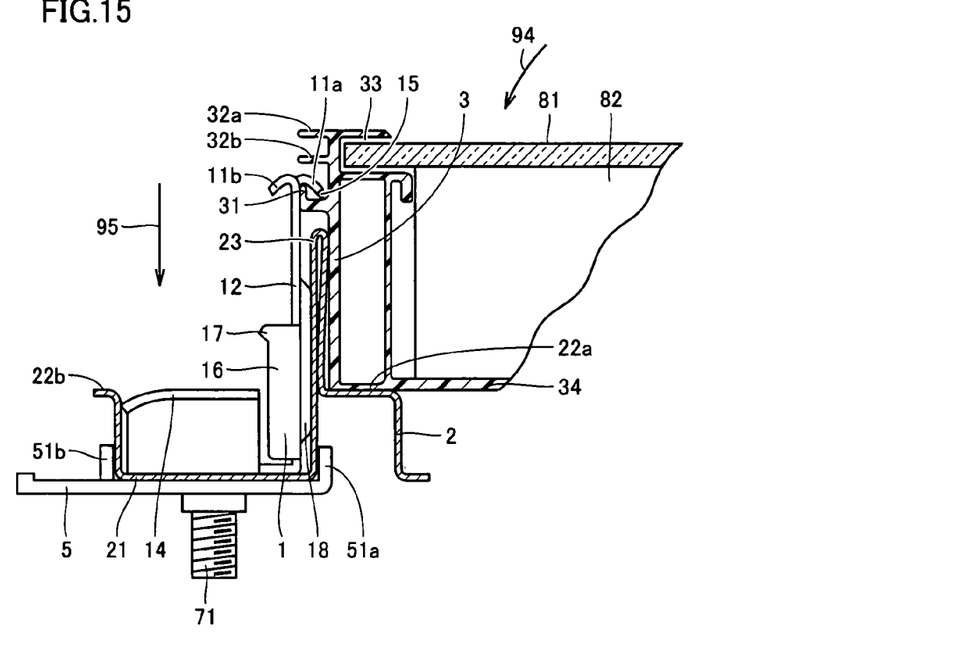
FIG. 15 is a fragmentary cross section of structures including the solar cell module on the lowest side arranged on the lateral beam on the second lowest position.

FIG. 15 is a fragmentary cross section of the second lowest lateral beam fixed to the longitudinal beam. For arranging the lowest solar cell module, plate nut 5 and lateral beam 2 are fixed to the longitudinal beam, and then the solar cell module is laid on base 22a of lateral beam 2 as indicated by an arrow 94. In this state, fastening 1 is not arranged.

Then, fastening 1 is arranged on rail 21 of lateral beam 2 as indicated by an arrow 95, and is fixed thereto by bolt 71. In this operation, fastening 1 is arranged such that hook 11a of fastening 1 is engaged with L-shaped projection 31 of mount frame 3. Hooked portion 11a pushes mount frame 3 so that the solar cell module is fixed to lateral beam 2.

By the above method, the first solar cell module nearest to the roof edge is attached to the mounting device. For arranging the plurality of solar cell modules shifting in the lateral direction of the roof, similar operations are repeated in the lateral direction to fix the solar cell modules. Then, the second solar cell module that is second nearest to the roof edge is fixed.

Figure 16:
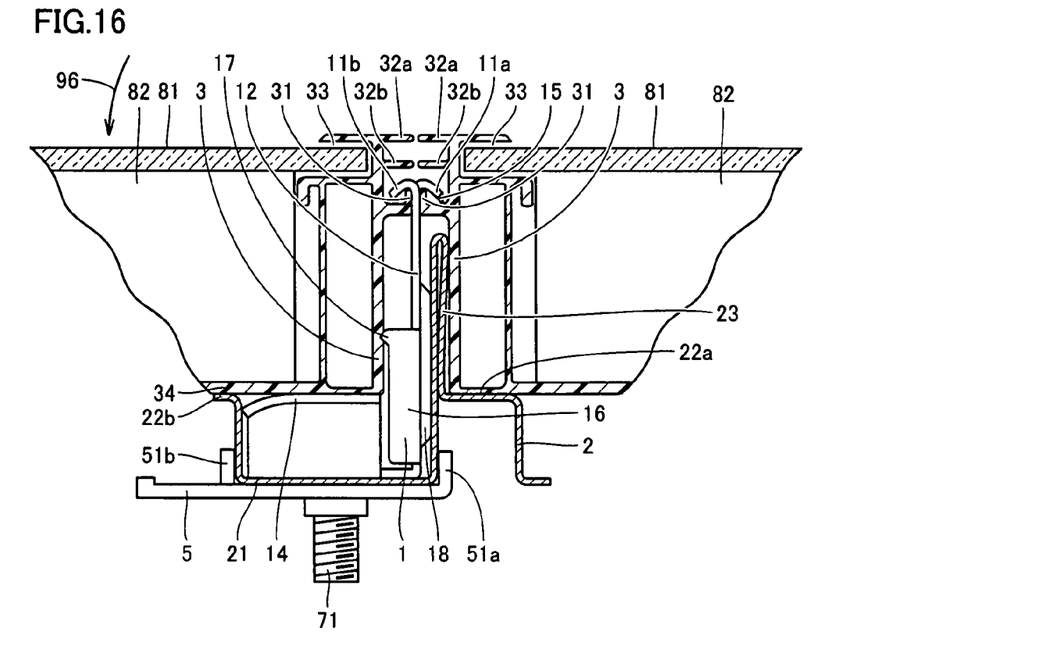
FIG. 16 is a fragmentary cross section of structures including the solar cell module on the second lowest side arranged on the lateral beam on the second lowest position.

FIG. 16 is a fragmentary cross section showing the second solar cell module fixed to the lateral beam. The lateral beam shown in FIG. 16 is the second lowest beam. For arranging the second solar cell module, the third lowest lateral beam is also arranged in advance, as is done similarly for arranging the lowest solar cell module.

The second solar cell module is fixed to the lateral beam. For fixing the second solar cell module, the solar cell module is arranged such that L-shaped projection 31 of mount frame 3 is engaged with hook 11b of fastening 1 as indicated by an arrow 96. The solar cell module is inclined, and mount frame 3 is brought into contact with fastening 1. Then, solar cell module is arranged to keep its main surface substantially parallel to the roof surface.

Hooked portion 11b of fastening 1 is engaged with L-shaped projection 31 of mount frame 3 to fix the solar cell module to lateral beam 2, similarly to the arrangement of the lowest solar cell module (see FIGS. 13 and 14). For fixing the second solar cell module, it is fixed to the third lowest lateral beam similarly to the method already described (see FIG. 15).

As described above, the solar cell modules can be successively arranged and fixed while changing the position from the edge side toward the ridge.

Figure 17:
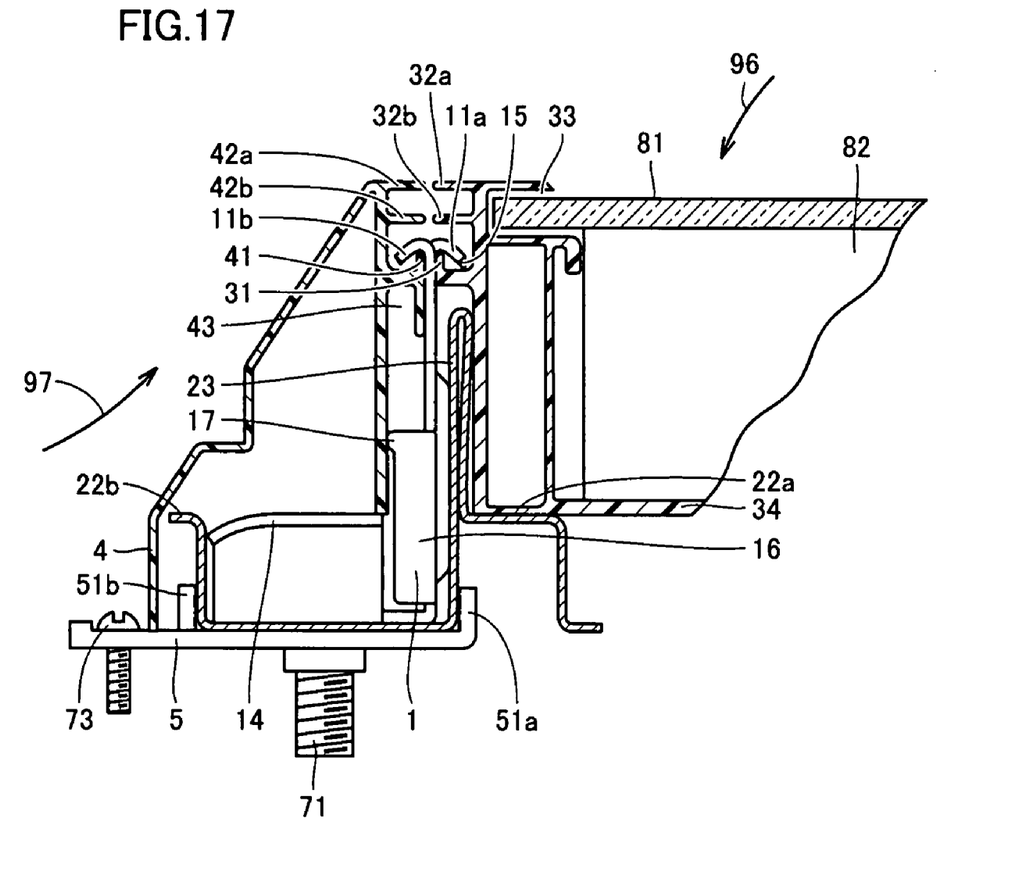
FIG. 17 is a fragmentary cross section of structures including the solar cell module arranged on the lateral beam on the highest position.

FIG. 17 is a fragmentary cross section of the highest lateral beam, i.e., the lateral beam nearest to the roof ridge. After fixing the highest solar cell module, edge/ridge cover 4 is attached to lateral beam 2. As indicated by arrow 97, edge/ridge cover 4 is inserted to engage its L-shaped projection 41 with hook 11b of fastening 1.

A screw 73 is inserted through guide hole 52 and is fixed to plate nut 5 so that edge/ridge cover 4 is prevented from turning and disengaging in the direction opposite to arrow 97. Thus, a head of screw 73 can hold edge/ridge cover 4 to prevent disengagement thereof.

Screw 73 may be connected, e.g., to a ground cable with a solderless terminal. The lateral beams and longitudinal beams are fixed together, e.g., by metal bolts, and each fastening is fixed in contact with the lateral beam. Projection 15 or 17 formed on fastening 1 is stuck into an alumite layer of the mount frame of the solar cell module, and is in contact with a base aluminum material so that the whole solar cell device can be grounded.

According to the mounting structure of the solar cell module of the embodiment, as described above, the solar cell modules are be successively arranged in the ascending order, and it is not necessary to arrange an independent cover over the boundary between the solar cell modules in contrast to the prior art. Therefore, a worker is not required to keep an unnatural posture for fastening nuts or to stretch his/her arm over the solar cell module for fixing a cover between the solar cell modules, and the workability is remarkably improved.

Further, the mounting structure of the solar cell module of the embodiment reduces a distance between the solar cell modules, and remarkably improves the installation efficiency.

For example, in the prior art, a fastening such as a bolt is arranged between the solar cell modules. According to the embodiment, however, it is not necessary to arrange a bolt or the like between the solar cell modules, and the installation efficiency can be high.

In the mounting device of the solar cell modules according to the embodiment, the fixing member includes the body and the plurality of hooks. The hooks have a first hook bent toward one side and a second hook bent oppositely to the one side, and is engaged with the hooked engagement portion formed at the solar cell module. By employing this structure, the solar cell modules can be arranged on the opposite sides of the body, respectively, so that the installation efficiency of the solar cell modules can be improved, and the workability and safety in the arranging operation can be remarkably improved.

In this embodiment, each of the body and the attaching portion fixed to the beam member has a plate-like form, and has a substantially vertical main surface. By employing this structure, the technology can be applied to the solar cell modules of different thicknesses by changing the length of the body. Thus, the technology can be applied to the solar cell module having an arbitrary thickness.

Further, according to the embodiment, the attaching portion of the fastening is arranged under the solar cell module. Employment of this structure can reduce a distance between the solar cell modules, and can improve the installation efficiency. For example, the attaching portion may be arranged between the solar cell modules (i.e., on the side of the solar cell module), but it is preferable to arrange the attaching portion under the solar cell module in view of the installation efficiency.

Further, according to the embodiment, the hooks are formed such that the first and second hooks are formed alternately to each other in the direction of alignment of the first and second hooks. Employment of this structure can uniformly disperse, in the fastening, a reaction force applied from the solar cell module pushed by the first hook and a reaction force applied from the solar cell module pushed by the second hook, and can fix the solar cell module while stably pushing it.

The first hook in the embodiment has the projection formed at the portion engaged with the engagement portion formed on the mount frame. By employing this structure, the projection can be stuck into the engagement portion of the solar cell module to perform grounding. The projection stuck into the mount frame of the solar cell module can suppress lateral movement of the solar cell module, and can stably fix it.

In this embodiment, the first hook is provided with the projection. However, this structure is not restrictive, and either of the first and second hooks may be provided with the projection.

In the embodiment, the fastening includes the receiver for carrying the bottom of the solar cell module upward from the lower side. By employing this structure, the screw for fixing the fastening can be arranged under the solar cell module. Also, the area for carrying the solar cell module can be increased, and the solar cell module can be carried stably. Also, the receiver of the solar cell module can be arranged near the boundary side wall of the lateral beam, and the strength of the portion receiving the solar cell module can be increased.

In the embodiment, the fastening includes the fin formed for contact with the side surface of the solar cell module. By employing this structure, the side surface of the solar cell module can be pushed so that the solar cell module can be positioned easily.

In this embodiment, the fin has the projection, and the projection is projected toward the solar cell module. By employing this structure, the projection is stuck into the solar cell module to suppress the movement of the solar cell module in the height direction, and the solar cell module can be fixed stably.

In the embodiment, the projection formed at the first hook and the projection formed at the fin are directed in the opposite directions, respectively. By employing this structure, the reaction forces applied to the respective projections from the solar cell module can cancel each other, and the solar cell module can be carried stably.

In the embodiment, the lateral beam serving as the beam member includes the rail having the substantially U-shaped section. By employing this structure, the lateral beam can be easily arranged with respect to the lateral beam. The lateral beam in the embodiment has the opening extending in the longitudinal direction of the beam. Employment of this structure allows sliding of the fastening in the extension direction of the lateral beam, and can facilitate the positioning of the fastening. Thereby, the solar cell module can be freely fixed within a slidable positioning range of the fastening so that the work can be performed more flexibly, and the solar cell device can be installed easily. Further, even when the positions of the longitudinal beams and/or the distances between them vary depending on the structure of the roof, the fastening can be attached in the region avoiding the region where the lateral beam and the longitudinal beam cross each other.

The lateral beam in the embodiment has the base that is formed on the side opposite to the rail for arranging the solar cell module on it. Thereby, the simple structure can be employed for carrying one side of the solar cell module by the lateral beam.

In this embodiment, the lateral beam has the boundary side wall formed by upwardly extending the side wall on one side of the rail. Employment of this structure increases the strength of the lateral beam. Further, the base for arranging the solar cell module can be formed easily. Further, the solar cell module can be carried stably.

In the embodiment, the fastening is provided at its rear surface with the plurality of touching portions for contact with the boundary side wall. Each touching portion has a longitudinal direction substantially parallel to the vertical direction. Employment of this structure can prevent accumulation of water such as rainwater between the fastening and the boundary side wall due to a capillary phenomenon. Consequently, corrosion of the fastening, lateral beam and the like can be prevented. Since the plurality of touching portions are arranged, the fastening can be in contact with the lateral beam through the plurality of portions, and therefore can be stably carried.

In the embodiment, the plate nut is arranged under the lateral beam, and has the contact portion to be fit to the lateral beam. The contact portion protrudes from the surface of the plate nut. Employment of this structure can prevent the plate nut from rotating together with the bolt or screw when the bolt is being rotated for fixing the lateral beam to the longitudinal beam. When arranging each plate nut, the screw may be inserted into the guide hole for fixing in advance the plate nut to the lateral beam.

In the embodiment, the hook has a substantially V-shaped section. However, another form may be employed provided that it has a hooked form allowing engagement of the end portion. For example, the hook may have an L-shaped section. Likewise, the engagement portion formed at the solar cell module can have any form provided that the engagement can be performed.

In this embodiment, the body of the fastening is provided at its end with the hook. However, this structure is not restrictive, and the body may have the hook in another position. Also, the body may have any form other than the plate form. In this embodiment, one bolt fixes the lateral beam, fastening and plate nut, and the lateral beam is fixed to the longitudinal beam in the position different from that of the fastening. However, this structure is not restrictive, and such a structure may be employed that the one bolt fixes the lateral beam, fastening, plate nut and longitudinal beam.

The embodiment has been described in connection with the example in which the solar cell device is mounted on the roof. However, this structure is not restrictive, and the technology can be applied to the structure of mounting the solar cell module on any place.

In the figures relating to the embodiment, the same or corresponding portions bear the same reference numbers.

Although the present technology has been described and illustrated in detail, it is clearly understood that the same is by way of illustration and example only and is not to be taken by way of limitation, the scope of the present technology being interpreted by the terms of the appended claims.

INDUSTRIAL APPLICABILITY

The technology can be applied to the mounting structure of the solar cell module.

The invention claimed is:

1. A mounting structure of a solar cell module comprising:
a solar cell module that includes:
an element plate provided with a solar cell element that generates electricity when irradiated with light, and
a mount frame surrounding sides of said element plate, wherein the mount frame comprises an upwardly extending engagement portion;
a beam member having a rail and upwardly extending legs;
a fixing member for attaching the solar cell module to the beam member, wherein said fixing member is mounted to the rail of the beam member between the legs, and wherein the fixing member includes:
a body,
a plurality of hooks formed at an end of said body and each having a hooked form, said hooks including a first hook having a form bent toward one side of the body, and having an end directed downward, and a second hook having a form bent away from said one side, and having an end directed downward, and at least one of said first and second hooks being opposed to and engaged with the upwardly extending engagement portion of said solar cell module, and
a projection on the fixing member that is opposed to said solar cell module and that provides an electrical connection between the fixing member and the mount frame of the solar cell module.

2. The mounting structure of the solar cell module according to claim 1, wherein an attaching portion of said body of the fixing member has a plate-like form that is in contact with said rail of said beam member, and wherein a sidewall of the body extends upward from and perpendicular to said attaching portion.

3. The mounting structure of the solar cell module according to claim 2, wherein said attaching portion is arranged under said solar cell module.

4. The mounting structure of the solar cell module according to claim 1, wherein said hooks are formed such that said first and second hooks are located alternately to each other in the direction of alignment of said first and second hooks.

5. The mounting structure of the solar cell module according to claim 1, wherein the projection is formed on the end of at least one of said first and second hooks, the projection being engaged with said upwardly extending engagement portion of the mount frame.

6. The mounting structure of the solar cell module according to claim 1, wherein said fixing member includes a receiver for carrying a bottom of said solar cell module from a lower side.

7. The mounting structure of the solar cell module according to claim 1, wherein said fixing member includes a fin being in contact with a side surface of said solar cell module.

8. The mounting structure of the solar cell module according to claim 7, wherein the projection on the fixing member is located on said fin.

9. The mounting structure of the solar cell module according to claim 8, wherein at least one of said first and second hooks has a projection at a portion engaged with said engagement portion, and the projection of said hook is formed on a side of the sidewall that is opposite to said fin.

10. The mounting structure of the solar cell module according to claim 1, wherein said solar cell module also includes
a rib arranged above said engagement portion, said rib having a plane form that covers a space between said element plate and said fixing member.

11. The mounting structure of the solar cell module according to claim 1, wherein said beam member is configured to allow the fixing member to be mounted at a plurality of positions along a length of the rail of the beam member, and wherein the beam member further comprises a base formed for receiving and supporting said solar cell module, the base being located on a side of one of the legs that is opposite to said rail.

12. The mounting structure of the solar cell module according to claim 11, wherein said beam member has a boundary side wall formed by one of the legs that extends upward from the rail.

13. The mounting structure of the solar cell module according to claim 12, wherein said fixing member includes a plurality of touching portions projected for contact with said boundary side wall, and a longitudinal direction of each of said touching portions is substantially parallel to a vertical direction.

14. The mounting structure of the solar cell module according to claim 6, wherein the receiver comprises at least one wall that extends upward from an attaching portion of the fixing member that is coupled to the rail of the beam member, and wherein an upper end of the receiver contacts and supports a lower surface of the solar cell module.

15. The mounting structure of the solar cell module according to claim 7, wherein the fin comprises a vertically extending wall that extends from an edge of a sidewall of the fixing member, the fin extending inward and over an attaching portion of the fixing member that is coupled to the rail of the beam member.

16. The mounting structure of the solar cell module according to claim 1, further comprising a plate nut that is located below the rail of the beam member, the plate nut including a screw hole therethrough, wherein a fastener passes through the fastening member, the rail and into the screw hole of the plate nut to fix the fastening member to the beam member.

17. The mounting structure of the solar cell according to claim 16, wherein an elongated hole is formed through the rail of the beam member, the elongated hole extending in the length direction of the beam member, and wherein the fastener passes through the elongated hole to couple the fastening member to the beam member.

18. The mounting structure of claim 16, wherein first and second projections are formed on an upper surface of the plate nut, the first and second projections being located so that they engage the outer sides of the legs of the beam member to prevent the plate nut from rotating relative to the beam member.

19. The mounting structure of claim 12 wherein the solar cell module comprises a first solar cell module, and further comprising a second solar cell module, wherein the first solar cell module is mounted on a first side of the boundary sidewall of the beam member, wherein the second solar cell module is mounted on a second opposite side of the boundary sidewall, and wherein when the fastening member is coupled to the beam member, the first hook of the fastening member engages with the engagement portion of the first solar cell module to hold the first solar cell module to the beam member and the second hook of the fastening member engages with the engagement portion of the second solar cell module to hold the second solar cell module to the beam member.

20. A mounting structure of a solar cell module, comprising:
    a solar cell module that includes:
        an element plate provided with a solar cell element that generates electricity when irradiated with light, and
        a mount frame surrounding sides of said element plate, wherein the mount frame comprises an upwardly extending engagement portion;
    a beam member having a rail and upwardly extending legs;
    a fixing member for attaching the solar cell module to the beam member, wherein said fixing member is mounted to the rail of the beam member between the legs, and wherein the fixing member includes:
        a body,
        a plurality of hooks formed at an end of said body and each having a hooked form, said hooks including a first hook having a form bent toward one side of the body, and having an end directed downward, and a second hook having a form bent away from said one side, and having an end directed downward, and at least one of said first and second hooks being opposed to and engaged with the upwardly extending engagement portion of said solar cell module, and
        a fin that is in contact with a side surface of said solar cell module, wherein the fin comprises a vertically extending wall that extends from an edge of a sidewall of the fixing member, the fin extending inward and over an attaching portion of the fixing member that is coupled to the rail of the beam member.

* * * * *